US006459088B1

United States Patent
Yasuda et al.

(10) Patent No.: US 6,459,088 B1
(45) Date of Patent: Oct. 1, 2002

(54) DRIVE STAGE AND SCANNING PROBE MICROSCOPE AND INFORMATION RECORDING/REPRODUCING APPARATUS USING THE SAME

(75) Inventors: Susumu Yasuda, Machida; Shunichi Shido, Zama; Junichi Seki, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/353,152

(22) Filed: Jul. 14, 1999

(30) Foreign Application Priority Data

Jan. 16, 1998 (JP) .......................................... 10-218600

(51) Int. Cl.[7] .................................................. H02N 2/04
(52) U.S. Cl. ................... 250/442.11; 310/328; 369/126
(58) Field of Search ........................... 250/442.11, 306, 250/423 F, 307; 310/328, 323; 369/126; 73/105

(56) References Cited

U.S. PATENT DOCUMENTS

| | | | | |
|---|---|---|---|---|
| 4,343,993 A | * | 8/1982 | Binnig et al. ................ 250/306 |
| 4,724,318 A | | 2/1988 | Binnig ......................... 250/306 |
| 5,214,342 A | * | 5/1993 | Yang ............................ 310/328 |
| 5,299,184 A | | 3/1994 | Yamano et al. ........... 369/44.28 |
| 5,329,122 A | | 7/1994 | Sakai et al. ................... 250/306 |
| 5,371,727 A | | 12/1994 | Shido et al. ................. 369/124 |
| 5,426,631 A | * | 6/1995 | Miyazaki et al. ............ 369/126 |
| 5,485,451 A | | 1/1996 | Yamano et al. .............. 369/126 |
| 5,526,334 A | | 6/1996 | Yamano et al. ................ 369/53 |
| 5,680,387 A | * | 10/1997 | Yamano et al. .............. 369/126 |
| 5,729,015 A | * | 3/1998 | Tong ............................ 250/306 |
| 5,751,684 A | | 5/1998 | Takeda et al. ............... 369/126 |
| 5,786,654 A | * | 7/1998 | Yoshida et al. .............. 310/328 |
| 5,805,541 A | * | 9/1998 | Takeda et al. ............... 369/126 |
| 5,831,961 A | | 11/1998 | Sakai et al. .................. 369/126 |
| 6,215,121 B1 | * | 4/2001 | Fujihira et al. .............. 250/306 |
| 6,246,054 B1 | * | 6/2001 | Toda et al. ................... 250/306 |
| 6,257,053 B1 | * | 7/2001 | Tomita et al. ................. 73/105 |

FOREIGN PATENT DOCUMENTS

| | | | |
|---|---|---|---|
| JP | 63-161552 | 7/1988 | |
| JP | 63-161553 | 7/1988 | |
| JP | 60-46246 | 6/1994 | |
| JP | 10271856 A | * 10/1998 | ............ H02N/2/00 |

OTHER PUBLICATIONS

Dürig, U., et al., "Near–Field Optical–Scanning Microscopy", Journal of Applied Physics, vol. 59, No. 10, pp. 3318–3327 (May 15, 1986).

* cited by examiner

Primary Examiner—Kiet T. Nguyen
(74) Attorney, Agent, or Firm—Fitzpatrick, Cella, Harper & Scinto

(57) ABSTRACT

A drive stage comprises a support body, a plurality of movable parts movably supported relative to the support body, and an actuator for driving the plurality of movable parts to move. The plurality of movable parts are driven by the actuator to move in directions selected to mutually offset the inertial forces generated in the respective movable parts. The drive stage is suitably used as incorporated into a scanning probe microscope or an information recording/reproducing apparatus for driving a probe or a mechanical stage supporting a specimen or a recording medium.

12 Claims, 11 Drawing Sheets

$X = \cos \omega t$
$Y = \sin \omega t$

DRIVE STAGE AND SCANNING PROBE MICROSCOPE AND INFORMATION RECORDING/REPRODUCING APPARATUS USING THE SAME

BACKGROUND OF THE INVENTION

1. Field of the Invention

This invention relates to a drive stage and also to a scanning probe microscope and an information recording/reproducing apparatus using such an drive stage.

2. Related Background Art

The recent invention of the scanning tunneling microscope (hereinafter referred to as STM) made it possible to visually observe an image of the surface of an electrocoductive substance with a degree of resolution of the nanometer level or lower (U.S. Pat. No. 4,343,993) so that now the arrangement of atoms of the surface of metal or semiconductor and the orientation of organic molecules are equally observable. Furthermore, the atomic force microscope (hereinafter referred to as AFM) adapted to observe the surface of an insulating substance with the degree of resolution of the STM has been developed as an extension of the STM technology (U.S. Pat. No. 4,724,318). The scanning near-field optical microscope (hereinafter referred to as SNOM) has also been developed from the STM. It can be used to examine the surface of a specimen by utilizing evanescent light seeping out from the micro-aperture arranged at the micro-tip of the sharp probe of the microscope [During et al., J. Appl. Phys. 59, 3318 (1986)]. Currently, these and other similar microscopes are globally referred to as the scanning probe microscope (hereinafter abbreviated as SPM) and used to measure the tunneling current, the electronic state density, the interatomic force, the intermolecular force, the frictional force, the elastic force, the evanescent light, the magnetic force and other various physical values of the surface of a specimen.

The above described SPM technology is being applied to memories. For example, Japanese Patent Application Laid-Open Nos. 63-161552 and 63-161553 describe a method of recording/reproducing information by means of an STM and a recording medium of a material capable of storing information on the volt-ampere switching characteristic of the recording medium, which may typically be realized in the form of a thin film layer of a π-electron type organic compound or a chalcogen compound. With the proposed method, a change in the characteristic is made to occur and recorded in a minute region of the recording medium located right below the probe of the STM by applying a voltage higher than a certain threshold level, utilizing the phenomenon that the tunneling current flowing between the probe and the recording medium changes depending on the recording section and the non-recording section of the recording medium. With the proposed method, an information processing apparatus having a recording density of $10^{12}$ bits/$cm^2$ can be realized, provided that a bit size of 10 nm in diameter is selected for the recording.

It is also known that a recording medium in the form of a thin film of a metal such as Au or Pt that becomes locally molten or evaporated to produce a projection or a recess on the surface when a voltage exceeding a certain threshold level is applied thereto can be used for recording/reproducing information concurrently.

With any of the above described SPMs, the probe is driven to move relative to the surface of a specimen or a recording medium by a drive stage and the physical interaction between the probe and the specimen is detected in order to obtain an image or record/reproduce information. FIGS. 1 through 3 of the accompanying drawings schematically illustrate known drive stages.

The drive stage shown in FIG. 1 comprises a cylindrical piezoelectric element 1000 and four electrodes 1001 through 1004 arranged on the outer periphery of the cylindrical piezoelectric element in four respective equally divided sectors thereof (although the electrode 1004 is not visible in FIG. 1). A mechanical stage 1005 is connected to the top of the piezoelectric element (although it is separated from the piezoelectric element in FIG. 1). The cylindrical piezoelectric element 1000 can be made to bend by controlling voltages applied to a pair of oppositely disposed electrodes (1001 and 1003 or 1002 and 1004) so as to cause one to expand and the other to contract. The piezoelectric element 1000 can be made to axially extend or contract by applying a same and identical voltage to all the four electrodes. Thus, the piezoelectric element 1000 can be made to extend or contract three-dimensionally by controlling the voltages applied to the four electrodes 1001 through 1004. Then, the mechanical stage 1005 bonded to the top of the piezoelectric element can be driven to move three-dimensionally.

FIG. 2 illustrates a uniaxial drive stage. It comprises a support body 2001 and a mechanical stage 2002 linked to the support body 2001 by means of parallel hinge springs 2003. These components may be integrally manufactured or assembled to produce the drive stage. Additionally, a piezoelectric actuator 2004 is linked to the mechanical stage 2002 and the support body 2001 respectively at the opposite ends thereof. With the illustrated drive stage, the mechanical stage 2002 can be driven to move leftwardly or rightwardly in FIG. 2 relative to the support body 2001 by applying a voltage to the piezoelectric actuator 2004 to make it expand or contract.

FIG. 3 illustrates a drive mechanism disclosed in Japanese Patent Publication No. 6-46246. Referring to FIG. 3, a mechanical stage 3003 is supported by two pairs of parallel hinge springs 3010, 3011 and 3012, 3013 at an end of each of them. The pair of parallel hinge springs 3010, 3011 are connected at the other end of each of them to a Y-axis drive piezoelectric actuator 3005 by way of an auxiliary support body 3001, while the pair of parallel hinge springs 3012, 3013 are connected at the other end of each of them to an X-axis drive piezoelectric actuator 3006 by way of another auxiliary support body 3002.

The auxiliary support body 3001 is supported by the parallel hinge springs 3010, 3011 and also by parallel hinge springs 3014, 3015 arranged perpendicularly relative to the hinge springs 3010, 3011 at an end of each of them, whereas the auxiliary support body 3002 is supported by the parallel hinge springs 3012, 3013 and also by parallel hinge springs 3016, 3017 arranged perpendicularly relative to the hinge springs 3012, 3013 at an end of each of them. All the parallel hinge springs 3014, 3015, the parallel hinge springs 3016, 3017, the Y-axis drive piezoelectric actuator 3005 and the X-axis drive piezoelectric actuator 3006 are connected at the other end of each of them to a substrate 3000.

With the above described arrangement, both the mechanical stage 3003 and the auxiliary support body 3001 are driven to move along the Y-axis as they are supported respectively by the parallel hinge springs 3012, 3013 and the parallel hinge springs 3014, 3015 when the Y-axis drive piezoelectric actuator 3005 is expanded or contracted. On the other hand, the parallel hinge springs 3010, 3011 are highly rigid along the Y-axis and hence move together in that direction. Similarly, both the mechanical stage 3003 and the auxiliary support body 3002 move together along the X-axis when the X-axis drive piezoelectric actuator is expanded or contracted.

Thus, the mechanical stage 3003 follows the motion of the Y-axis drive piezoelectric actuator 3005 and that of the X-axis drive piezoelectric actuator 3006 with complete fidelity so that the two motions do not interfere with each other on the mechanical stage 3003.

Then, the mechanical stage 3003 can be driven to move both in the X-axis and in the Y-axis in any desired fashion by means of the X-axis drive piezoelectric actuator 3006 and the Y-axis drive piezoelectric actuator 3005.

However, with any of the known drive stages of FIGS. 1 through 3, the inertial force generated in the mechanical stage increases as the drive stage is driven to move faster so that the support members will eventually vibrate due to the inertial force.

Then, such vibrations on the part of the support members give rise to blurred images when the drive stage is used for an SPM and information recording/reproducing errors when the drive stage is used for an information recording/ reproducing apparatus.

If a heavy support cabinet is used to suppress the vibration, the total weight of the apparatus to a great disadvantage thereof.

SUMMARY OF THE INVENTION

Therefore, it is the object of the present invention to solve the above identified problems of the known technologies and provide a drive stage that is compact, lightweight and practically free from vibrations if driven for high speed scanning and also a scanning probe microscope and an information recording/reproducing apparatus realized by using such a drive stage.

According to an aspect of the invention, the above object is achieved by providing a drive stage comprising:
 a support body;
 a plurality of movable parts movably supported relative to said support body; and
 an actuator for driving said plurality of movable parts to move;
 said plurality of movable parts being driven by said actuator to move in directions selected to mutually offset the inertial forces generated in the respective movable parts.

According to another aspect of the invention, there is also provided a drive stage comprising:
 a plurality of movable parts; and
 a plurality of cylindrical piezoelectric elements adapted to move said plurality of movable parts respectively, each of said piezoelectric elements having a plurality of drive electrodes arranged on the outer periphery thereof, said piezoelectric elements being arranged coaxially;
 said plurality of movable parts being driven respectively by said piezoelectric elements to move in directions selected to mutually offset the inertial forces generated in the respective movable parts.

According to still another aspect of the invention, there is also provided a scanning probe microscope comprising a stage and a probe arranged vis-a-vis the stage, either the stage or the probe being arranged on the movable parts of the above drive stage, said scanning probe microscope being adapted to observe the surface of the specimen by detecting the physical interaction of the specimen and the probe, while driving the specimen on the stage and the probe to move relative to each other by means of said drive stage.

According to a further aspect of the invention, there is also provided an information recording/reproducing apparatus comprising a recording medium and a probe arranged vis-a-vis the recording medium, either the recording medium or the probe being arranged on the movable parts of the above drive stage, said information recording/ reproducing apparatus being adapted to at least either record or reproduce information by applying a voltage between the recording medium and the probe, while driving the recording medium and the probe to move relative to each other by means of said drive stage.

DESCRIPTION OF THE PREFERRED EMBODIMENTS

In a drive stage according to the invention, the vibrations to which the support body is subjected can be reduced by driving the plurality of movable parts by the actuator to move in directions selected to mutually offset the inertial forces generated in the respective movable parts. Thus, if operated at high speed, the drive stage can be made relatively free from vibrations without raising the weight of the support body.

Additionally, the inertial forces generated in the plurality of movable parts of a drive stage according to the invention can be completely offset by each other to perfectly cancel vibrations when the requirement expressed by the formula below is met;

$$M_1 \cdot a_1 + M_2 \cdot a_2 + \ldots + M_n \cdot a_n = 0$$

where $M_1, M_2, \ldots, M_n$ respectively represent the masses of the plurality of movable parts (n being an integer not smaller than 2) and $a_1, a_2, \ldots, a_n$ respectively represent the acceleration vectors of the movable parts as observed when they are moving.

In a drive stage according to the invention, each of the plurality of movable parts is supported by an elastic member relative to the support body or the remaining movable parts. When one of the plurality of movable parts is moved relative to the remaining movable parts by the actuator, the moved movable part is made to show a frequency same as those of the remaining movable parts for free vibration. Then, the vibrations of movable parts will be perfectly cancelled because all the movable parts show a same resonance frequency.

Now, how the vibrations of the movable parts of a drive stage according to the invention will be discussed below.

Figure 1:
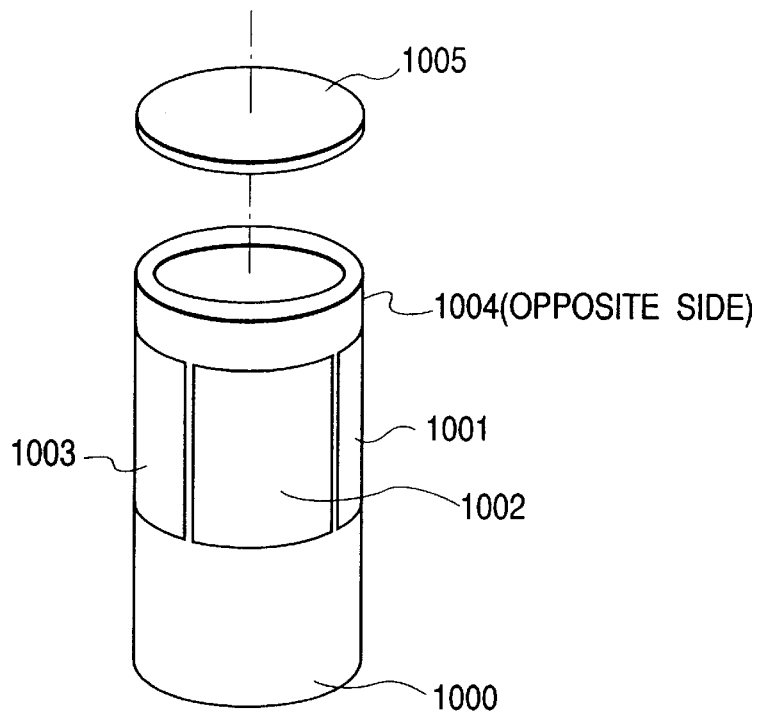
FIG. 1 is an exploded schematic perspective view of a known drive stage comprising a cylindrical piezoelectric element.
Figure 2:
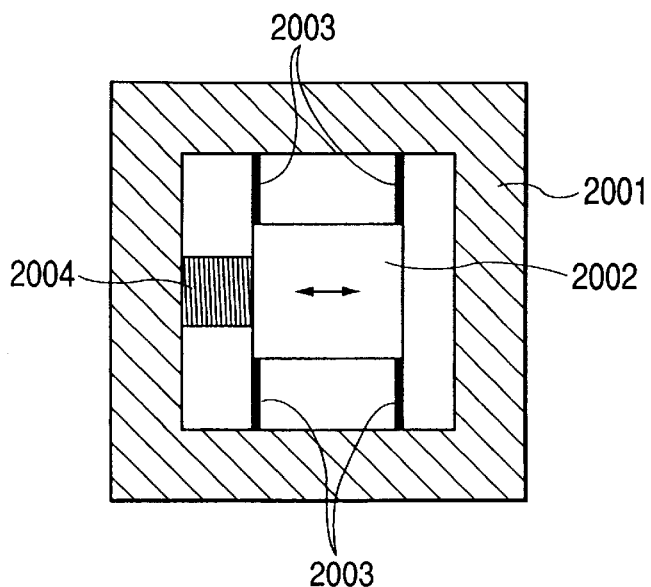
FIG. 2 is a schematic plan view of a known uniaxial drive stage.
Figure 3:
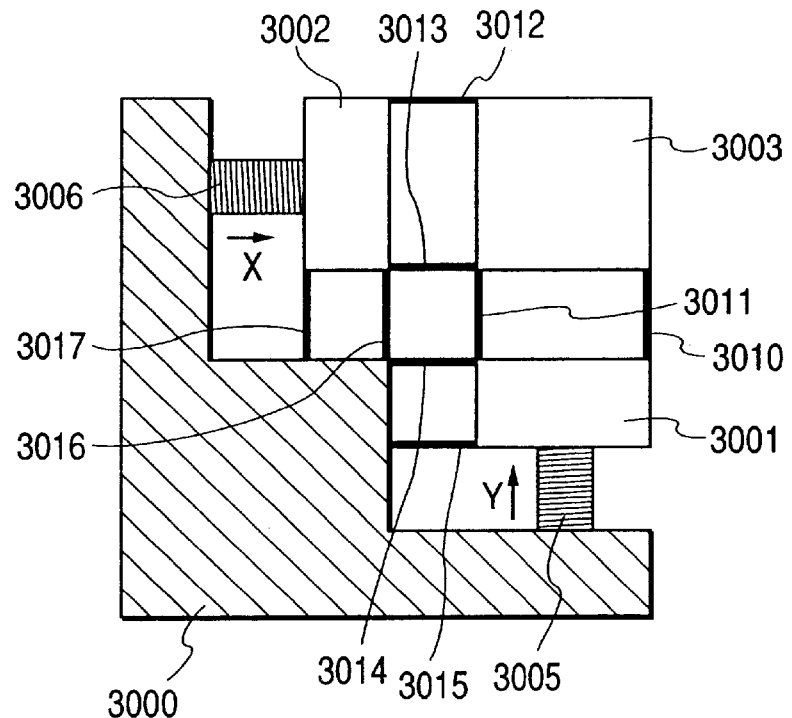
FIG. 3 is a schematic plan view of a known biaxial drive stage.
Figure 4:
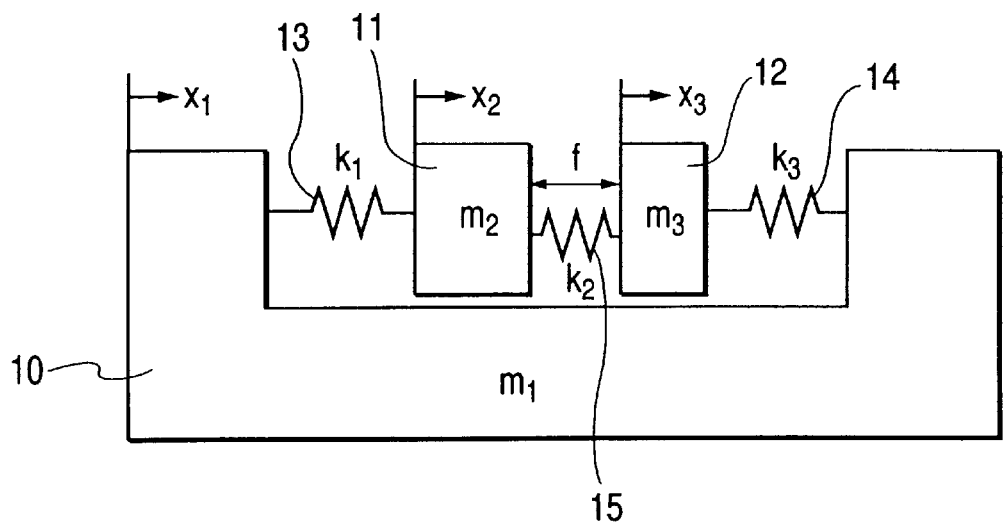
FIG. 4 is a schematic view of a mechanical model designed to illustrate a technique for cancelling inertial forces.

Firstly, a mechanical model as illustrated in FIG. 4 will be used to analyse the vibrations of the movable parts.

In FIG. 4, there are shown a support section 10, a first moving section 11, a second moving section 12, a first elastic member 13, a second elastic member 14 and a linear actuator 15.

If the viscous drag of the model is disregarded, the equation of motion of the model is expressed by mathematical formula below.

(mathematical formula 1)

$$\begin{cases} m_1 \dfrac{d^2 x_1}{dt^2} + k_1(x_1 - x_2) + k_3(x_1 - x_3) = 0 \\ m_2 \dfrac{d^2 x_2}{dt^2} + k_1(x_2 - x_1) + k_2(x_2 - x_3) = f \\ m_3 \dfrac{d^2 x_3}{dt^2} + k_2(x_3 - x_2) + k_3(x_3 - x_1) = -f \end{cases}$$

where $m_1$: mass of the support section, $m_2$: mass of the first moving section, $m_3$: mass of the second moving section, $x_1$: displacement of the support section, $x_2$: displacement of the first moving section, $x_3$: displacement of the second moving section, $k_1$: spring constant of the first elastic member, $k_2$: spring constant of the linear actuator, $k_3$: spring constant of the second elastic member, and f: drive force of the linear actuator.

Mathematical formula 2 below is obtained by subjecting the above mathematical formula 1 to Laplace transformation.

(mathematical formula 2)

$$\begin{pmatrix} m_1 s^2 + k_1 + k_3 & -k_1 & -k_3 \\ -k_1 & m_2 s^2 + k_1 + k_2 & -k_2 \\ -k_3 & -k_2 & m_3 s^2 + k_2 + k_3 \end{pmatrix} \begin{pmatrix} x_1(s) \\ x_2(s) \\ x_3(s) \end{pmatrix} = \begin{pmatrix} 0 \\ f(s) \\ -f(s) \end{pmatrix}$$

Then, mathematical formula 3 below is obtained by replacing the matrix on the left side with $\Delta$ and multiplying the both sides by the inverse matrix of $\Delta$.

(mathematical formula 3)

$$\begin{pmatrix} x_1(s) \\ x_2(s) \\ x_3(s) \end{pmatrix} = \Delta^{-1} \begin{pmatrix} 0 \\ f(s) \\ -f(s) \end{pmatrix}$$

The transfer function of the displacement $x_1$ of the support body relative to the drive force f is expressed by mathematical formula 4 below.

(mathematical formula 4)

$$\frac{x_1(s)}{f(s)} = \frac{(-k_3 m_2 + k_1 m_3) s^2}{|\Delta|}$$

Now, mathematical formula 5 below holds true because the resonance frequencies of any two movable parts are equal to each other in a drive stage according to the invention.

(mathematical formula 5)

$$\frac{k_1}{m_2} = \frac{k_3}{m_3}$$

As a result, the transfer function is held equal to 0. Thus, it will be seen that the inertial forces are perfectly cancelled and the support body is not vibrated by the drive force f.

Now, the present invention will be described in greater detail by referring to the accompanying drawings that illustrate preferred embodiments of the invention.

[Embodiment 1]

Figure 5:
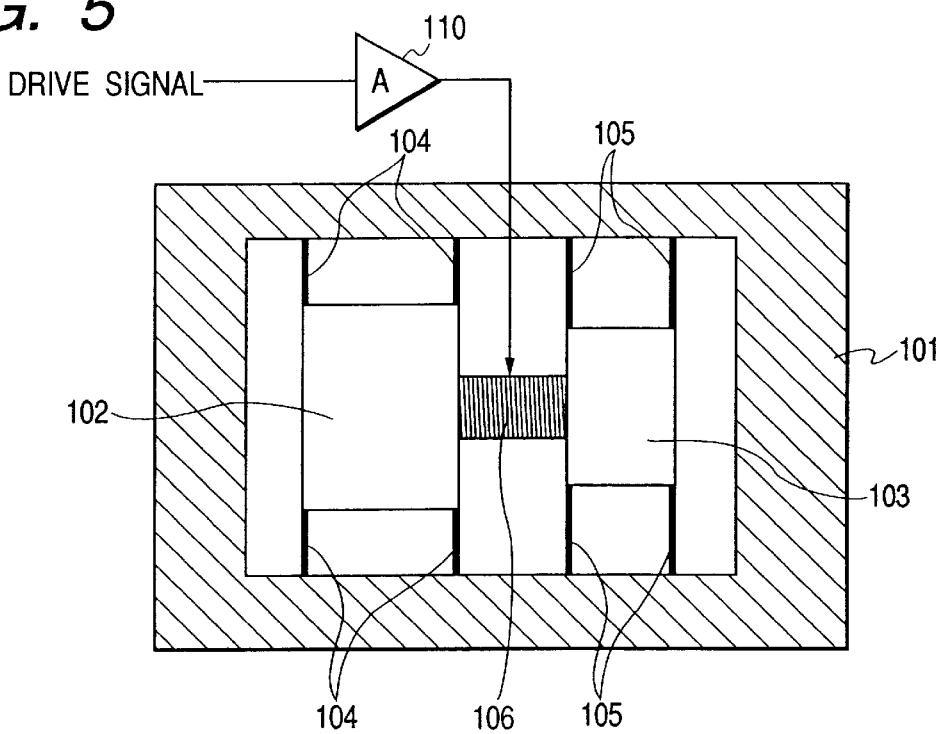
FIG. 5 is a schematic plan view of a first embodiment of drive stage according to the invention.

FIG. 5 is a schematic plan view of a first embodiment of drive stage according to the invention.

Referring to FIG. 5, mechanical stages 102, 103 are arranged inside a support body 101 and each of them is supported by four parallel hinge springs 104 or 105 such that they can move horizontally in FIG. 5. Piezoelectric actuator 106 is linked to the mechanical stage 102 at an end thereof and to the mechanical stage 103 at the other end thereof.

The piezoelectric actuator 106 is polarized in such a way that it is made to expand leftwardly and rightwardly in FIG. 5 when a voltage is applied thereto.

Drive signals are amplified by amplifier 110 before applied to the piezoelectric actuator 106.

This embodiment of drive stage according to the present invention comprises two mechanical stages, either or both of which may be used.

In the drive stage of this embodiment, the inertial force generated in the mechanical stage 102 is offset by the inertial force generated in the mechanical stage 103 so that the drive stage is relatively free from vibrations when driven to operate at high speed. Particularly, the two inertial forces can be perfectly cancelled by equalizing the resonance frequencies of the two mechanical stages.

[Embodiment 2]

Figure 6:
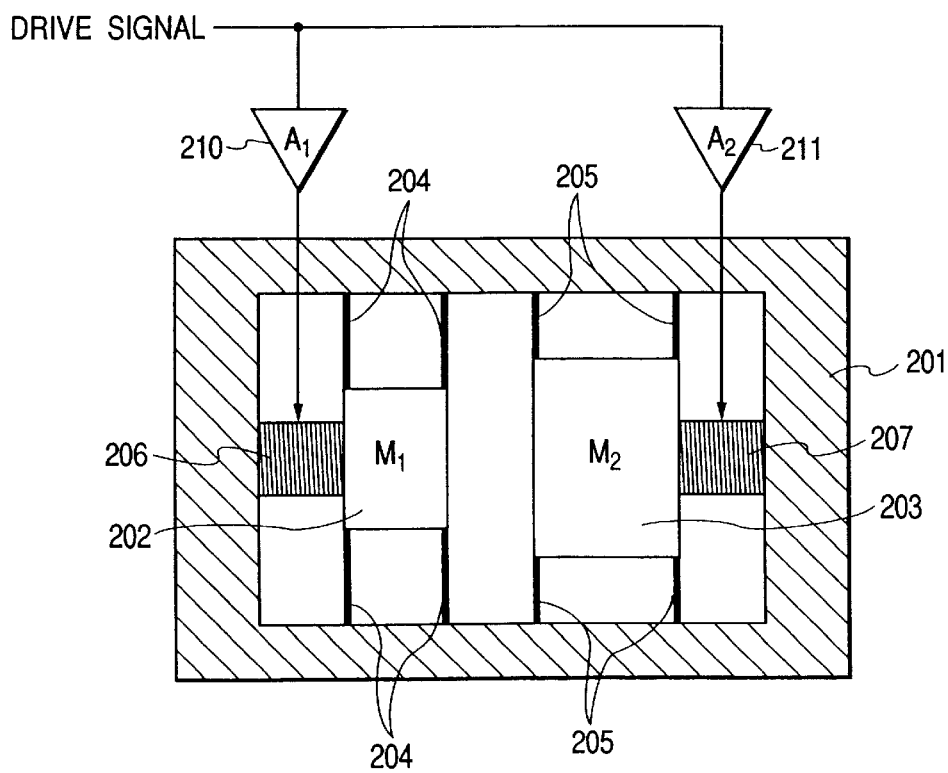
FIG. 6 is a schematic plan view of a second embodiment of drive stage according to the invention.

FIG. 6 is a schematic plan view of a second embodiment of drive stage according to the invention.

Referring to FIG. 6, mechanical stages 202, 203 are arranged inside a support body 201 and each of them is supported by four parallel hinge springs 204 or 205 such that they can move horizontally in FIG. 6. Piezoelectric actuators 206, 207 are linked to the support body 201 at an end thereof and to the respective mechanical stages 202, 203 at the other end thereof.

The two piezoelectric actuators 206, 207 are polarized in such a way that they are made to expand leftwardly and rightwardly in FIG. 6 when a voltage is applied thereto.

Drive signals are amplified by respective amplifiers 210, 211 before applied to the piezoelectric actuators 206, 207 respectively.

Note that the signal amplification factors $A_1$, $A_2$ of the amplifiers 210, 211 are selected in such a way that, when the mechanical stages 202, 203 are driven to move, the inertial forces of the mechanical stages show an equal volume and oppositely directed.

In other words, when the masses and the drive accelerations of the mechanical stages 202, 203 are $M_1$, $M_2$ and $a_1$, $a_2$, equation of $M_1 \times a_1 = M_2 \times a_2$ holds true.

If the frequency characteristics of the operation of driving the mechanical stage 202 differ from those of the operation of driving the mechanical stage 203, the amplification factors are preferably selected as a function of the drive frequencies.

Additionally, the drive stage can be made free from vibrations regardless of the masses of the specimens to be placed on the mechanical stages by controlling the amplification factors as a function of the masses of the specimens.

This embodiment of drive stage according to to the present invention comprises two mechanical stages, either or both of which may be used.

When drive signals are applied to the drive stage of this embodiment, the mechanical stages 202, 203 are driven to move opposite directions in such a way that they show an equal inertial force. Therefore, the inertial forces transmitted to the support body 201 will be perfectly offset.

Therefore, the drive stage can operate with little vibrations if driven to operate for high speed scanning. The drive stage can be made further free from vibrations regardless of the masses to be placed on the mechanical stages by appropriately controlling the amplification factors of the amplifiers.

[Embodiment 3]

Figure 7:
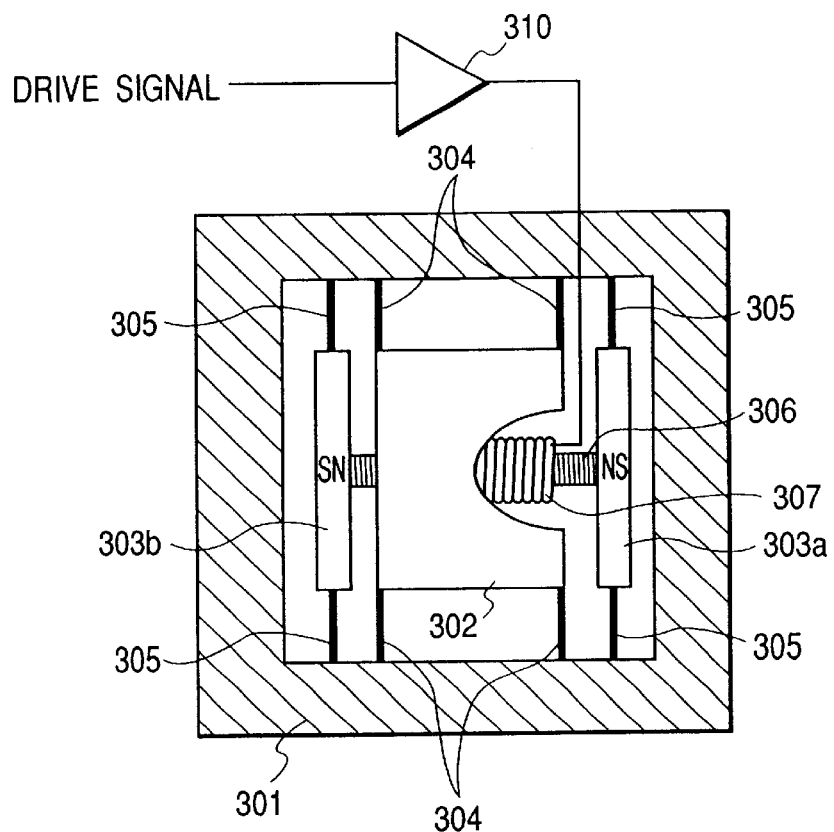
FIG. 7 is a schematic plan view of a third embodiment of drive stage according to the invention.

FIG. 7 is a schematic plan view of a third embodiment of drive stage according to the invention.

Referring to FIG. 7, a mechanical stage 302 and a pair of permanent magnets 303a, 303b are supported by respective parallel hinge springs 304, 305 such that they can horizontally move in FIG. 7. The permanent magnets 303a, 303b are arranged with their N poles directly facing each other.

The mechanical stage 302 is rigidly secured to coil 307 and a link rod 306 is running through the coil. The link rod 306 links the permanent magnets 303a, 303b such that the three members are integral with each other.

Figure 8:
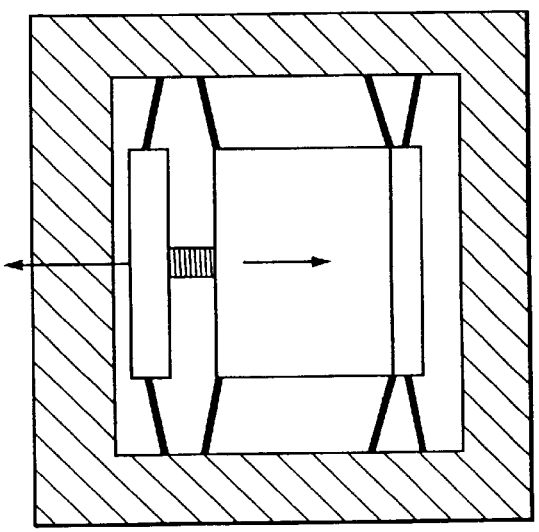
FIG. 8 is a schematic plan view of the third embodiment similar to FIG. 7 but illustrating how the drive stage moves.

Drive signals are amplified by amplifier 310 and applied to the coil 307 in this embodiment of drive stage. As a current is made to flow from the amplifier 310 to the coil 307, the coil 307 and the permanent magnets 303a, 303b are subjected to a force. The direction of this force is determined as a function of the magnetic fields of the permanent magnets 303a, 303b and the direction in which the electric current flows through the coil 307. FIG. 8 shows an arrangement in which, when an electric current is made to flow through the coil 307, a magnetic field is produced there to make the right end of the coil operate as S pole and the left end of the coil operate as N pole in FIG. 8 so that the mechanical stage 302 is driven to move rightwardly in FIG. 8 while the permanent magnets 303a, 303b are driven to move leftwardly. Thus, the mechanical stage 302 and the permanent magnets 303a, 303b are driven in opposite directions so that the inertial forces generated in them will be offset to consequently reduce the vibrations of the drive stage. Since the piezoelectric actuator is replaced by an electromagnetic actuator comprising a coil and permanent magnets in this embodiment, no hysteresis will be generated in the embodiment when it is driven to operate.

Additionally, the inertial forces in this embodiment can be perfectly cancelled by equalizing the resonance frequency of the mechanical stage 302 elastically supported by the parallel hinge springs 304 and the resonance frequency of the permanent magnets 303a, 303b elastically supported by the parallel hinge springs 305 and the link rod 306 that form an integral part of the drive stage.

Figure 9:
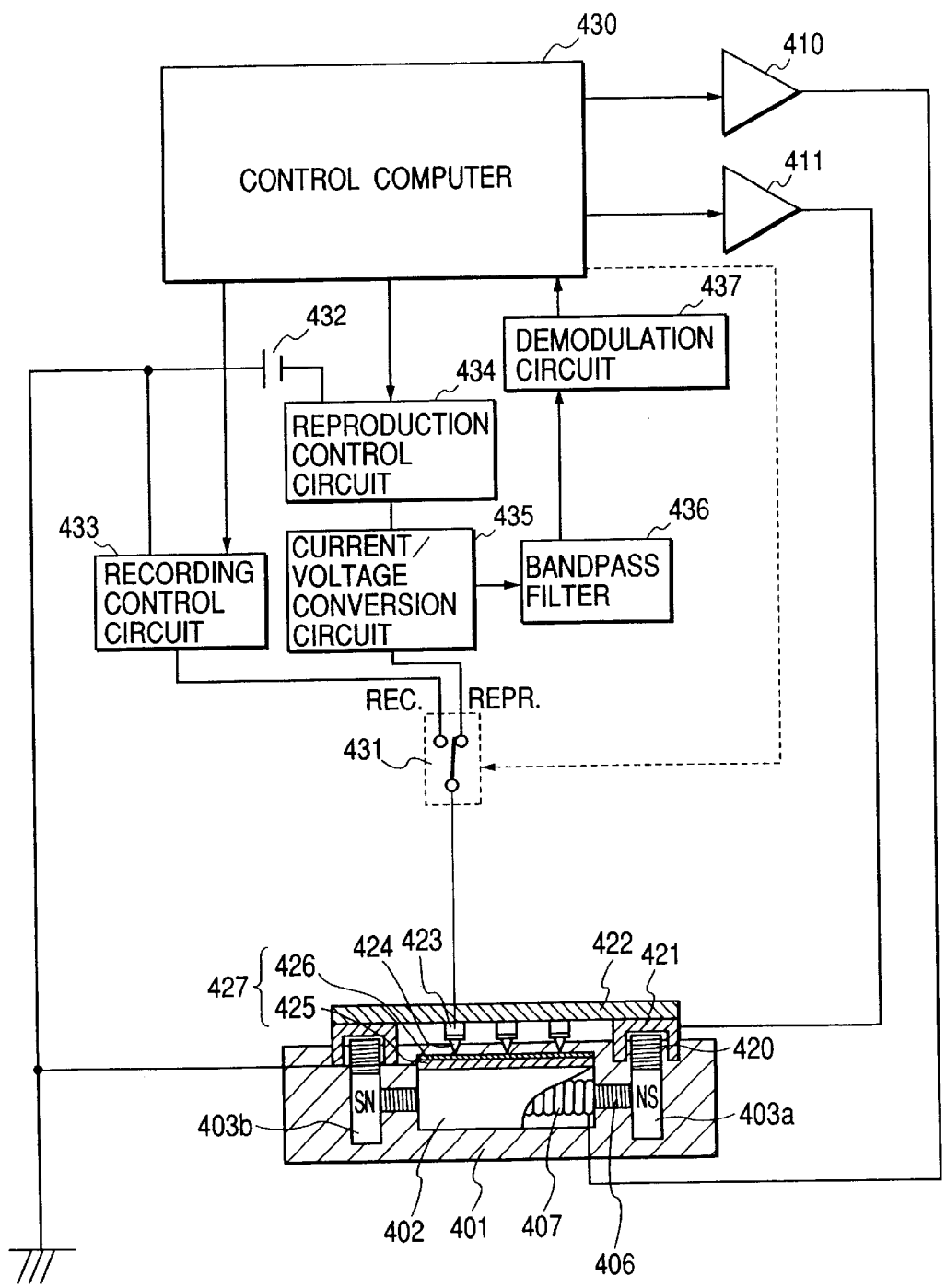
FIG. 9 is a schematic block diagram of an information recording/reproducing apparatus using a drive stage according to the invention.

FIG. 9 is a schematic block diagram of a recording/reproducing apparatus to which the third embodiment of drive stage is applied.

In FIG. 9, the components 401 through 407 of the drive stage are same as the components 301 through 307 of the drive stage FIG. 7.

Referring to FIG. 9, the drive stage is viewed laterally and partly omitted from the illustration for the purpose of simplification. The spring constants of the parallel hinge springs 404, 405 (not shown) are so selected that the objects supported respectively by them show a same resonance frequency.

A recording medium 427 comprising an electrocoductive substrate 425 and a recording layer 426 is arranged on the mechanical stage 402 and the electrocoductive substrate 425 is electrically grounded.

Y-drive mechanism guides 420 are linked to the tops of the permanent magnets 403a, 403b. Y-drive mechanism sliders 421 are arranged on the respective Y-drive mechanism guides 420 in such a way that they can move perpendicularly relative to the surface of the drawing. The Y-drive mechanism sliders 421 are adapted to be driven to move perpendicularly relative to the respective Y-drive mechanism guides 420 by a piezoelectric inchworm mechanism. A probe holding plate 422 is arranged on the two Y-drive mechanism sliders 421 for rigidly securing probes. Three minute cantilevers 423 with respective probes 424 fitted to the free ends thereof are rigidly secured to the probe holding plate 422 at the side facing the recording medium 427 in such a way that the tips of the probes 424 can contact the recording medium 427 with desired contact force.

If the elastic constant of elastic deformation of the cantilevers 423 is about 0.1N/m and the elastic deformation of the cantilevers 423 is about 1 $\mu$m as viewed from the tips of the probes 424, the contact force of the probes 424 relative to the recording medium 427 will be about $10^{-7}$N.

The probes 424 are electrocoductive and electrically connected to a recording control circuit 433 or a current/voltage conversion circuit 435 by way of a changeover switch 431. While the circuits connected to the leftmost probe are shown in the block diagram of FIG. 9, each of the remaining probes is connected to similar circuits.

The recording layer 426 is made of a material through which an electric current flows at a rate that varies as a function of the voltage applied thereto.

A first specific example of material that can be used for the recording layer 426 may be an LB film (an accumulation of organic monomolecular films prepared by a Langmuir Blodgett method) exhibiting an electric memory effect, using polymides such as disclosed in Japanese Patent Application Laid-Open Nos. 63-161552 and 63-161553 or SOAZ (bis-n-octyl-squarilium-azulene). The electroconductivity of an LB film changes (from an OFF-state to an ON-state) when a voltage exceeding a threshold level (about 5 to 10 V) is applied between the probe, the LB film and the substrate, whereby the electric current flowing through the LB film increases when a bias voltage (about 0.01 to 2 V) is applied for the purpose of reproducing information.

A second specific example of material that can be used for the recording layer 426 may be an amorphous thin film forming material such as GeTe, GaSb or SnTe. Any of these materials can give rise to a phase transfer from amorphism to crystal by the heat generated by the electric current flowing therethrough when a voltage is applied between the probe, the amorphous thin film forming material and the substrate. Then, the electrocoductivity of the material changes to increase the electric current when a bias voltage is applied for the purpose of reproducing information.

A third specific example of material that can be used for the recording layer 426 may be an easily oxidizable metal or semiconductor material such as Zn, W, Si or GaAs. Any of these materials can be made to react with water adsorbed on the surface or oxygen contained in air to form an oxide film on the surface by the electric current that flows therethrough when a voltage is applied between the probe, the easily oxidizable metal and the substrate. Then, the contact resistance of the surface of the material changes to decrease the electric current when a bias voltage is applied for the purpose of reproducing information.

When driving the probes 424 to scan the recording medium 427 of the above described recording/reproducing apparatus, the tips of the probes 424 arranged on the respective cantilevers 423 are constantly held in contact with the recording medium 427. Such a contact scanning technique is advantageous in that, if the surface of the recording medium 427 shows undulations and the conditions of the contact scanning vary due to the undulations, the variations in the contact scanning conditions are absorbed by the elastic deformation of the cantilevers 423 so that the contact force between the tips of the probes 424 and the surface of the recording medium 427 is held to a constant level to avoid any possible destruction on the part of the probes 424 and/or the recording medium 427. This technique does not require means for controlling the probes 424 in the direction perpendicular to the surface of the recording medium 424 and hence does not make the configuration of the apparatus a complex one. Therefore, it can suitably be used for an apparatus comprising a plurality of probes. Additionally, the probes 424 do not require a feed back control system for controlling them in the direction perpendicularly to the surface of the recording medium 24 and hence the probes 424 can be made to scan the recording medium 427 at high speed.

Now, the recording/reproducing procedures of the above described recording/reproducing apparatus will be described.

Figure 10A:
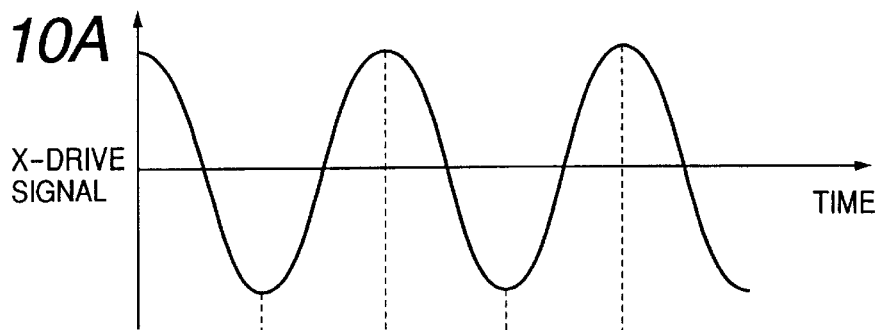
FIGS. 10A, 10B and 10C illustrate drive signals of the drive stage and a corresponding motion of the probe of the information recording/reproducing apparatus of FIG. 9.

Firstly, the probes 424 are made to scan the recording medium 427 for recording/reproducing information in a manner as described below. A sine wave signal as shown in FIG. 10A is input to the X-drive circuit 410 from a control computer 430. Then, the mechanical stage 402 and the permanent magnets 403a, 403b are driven to reciprocate in opposite directions. In this embodiment, a drive frequency of 10 Hz and an amplitude of reciprocation between the two opposite ends of 200 μm are selected. Then, the scanning speed of the probes 424 relative tot he recording medium 427 will be 4 mm/s in average. Since the mechanical stage 402 and the permanent magnets 403a, 403b are driven to move oppositely, their inertial forces will be perfectly offset.

Figure 10B:
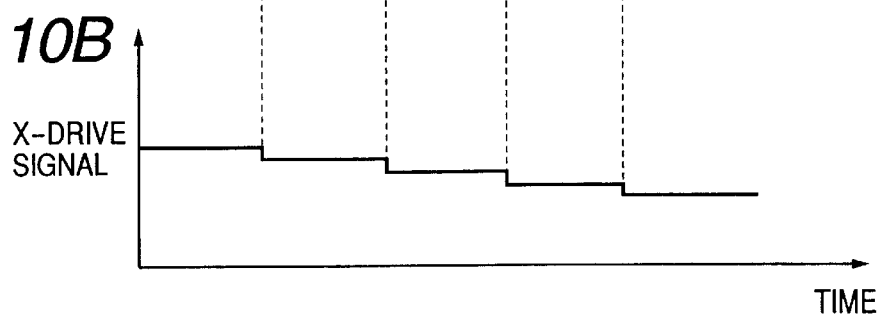

On the other hand, a signal as shown in FIG. 10B whose level is shifted in the Y direction by a step each time when the direction of driving the mechanical stage 402 is switched is applied to the Y drive circuit 411. The inchworm mechanism of the Y drive mechanism sliders 421 is driven by the signal and shifted step by step. In this embodiment, the distance of each shift is made equal to 20 nm. The movement of the probes in the Y direction does not practically give rise to any vibration because the acceleration in the Y direction is negligibly small if compared with the acceleration in the X direction.

Figure 10C:
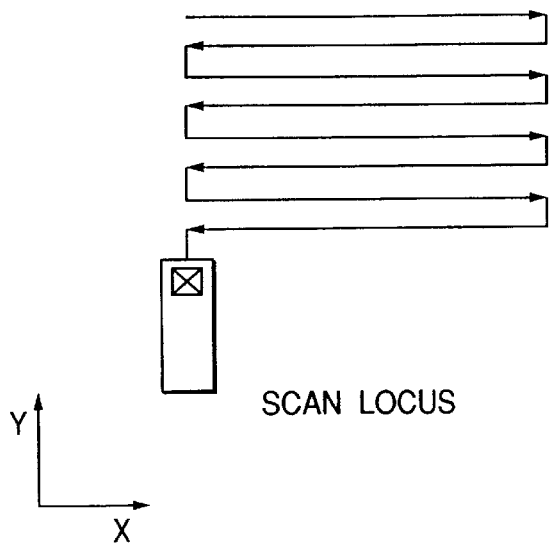

As signals as described above are applied respectively to the X drive circuit 410 and the Y drive circuit 411, the probes 424 scan the recording medium 427 in a raster-like fashion as shown in FIG. 10C.

In a process of recording information, the tips of the probes 424 are held in contact with the surface of the recording medium 427 and made to scan the latter, while a recording signal generated from the recording control circuit 433 controlled by the control computer 430 is applied to the recording medium 427 by way of the changeover switch 431 turned to the recording system and then the probes 424. Then, pieces of information will be recorded locally in respective spots of the recording layer 426 where the tips of the probes 424 respectively contact the surface.

Then, the pieces of information recorded on the recording medium 427 will be reproduced in a manner as described below.

After switching the signal wires coming from the probes 424 to the reproduction system of the apparatus by means of the changeover switch 431, a scanning operation same as the one described above will be conducted while a bias voltage is applied between the probes 424 and the electrocoductive substrate 425 by means of the bias voltage applying means 432 and the reproduction control circuit 434 to convert the electric current flowing therebetween into a corresponding voltage in the current/voltage conversion circuit 435. A spot carrying a recorded bit on the surface of the recording medium 427 allows an electric current to flow at a rate greater (or smaller) than the flow rate of electric current in a spot not carrying any recorded bit on the surface of the recording medium 427 so that the presence or absence of a bit is expressed by a voltage signal. Then, the signal representing the reproduced piece of information is input to the control computer 430 by way of the bandpass filter 436 and the demodulation circuit 437 as binary data. Thus, the information recorded on the recording medium 427 can be reproduced in the above described fashion.

Since the vibrations attributable to the X directional drive of the above described information recording/reproducing apparatus of the invention are cancelled in a manner as described above, it is free from vibrations if driven at high speed for a scanning operation so that information can be recorded and reproduced accurately and reliably.

A scanning probe microscope can be realized by replacing the recording medium arranged on the drive stage of the recording/reproducing apparatus of FIG. 9 with a mechanical stage for specimen. With such a scanning probe microscope, the surface of the specimen placed on the mechanical stage can be observed by driving the specimen on the mechanical stage and the probes to move relative to each other by means of the drive stage and detecting the physical interaction between the specimen and the probes. Such a scanning probe microscope is practically free from vibrations generated by the moving mechanical stage and therefore can produce a fine image of the specimen.

[Embodiment 4]

Figure 11:
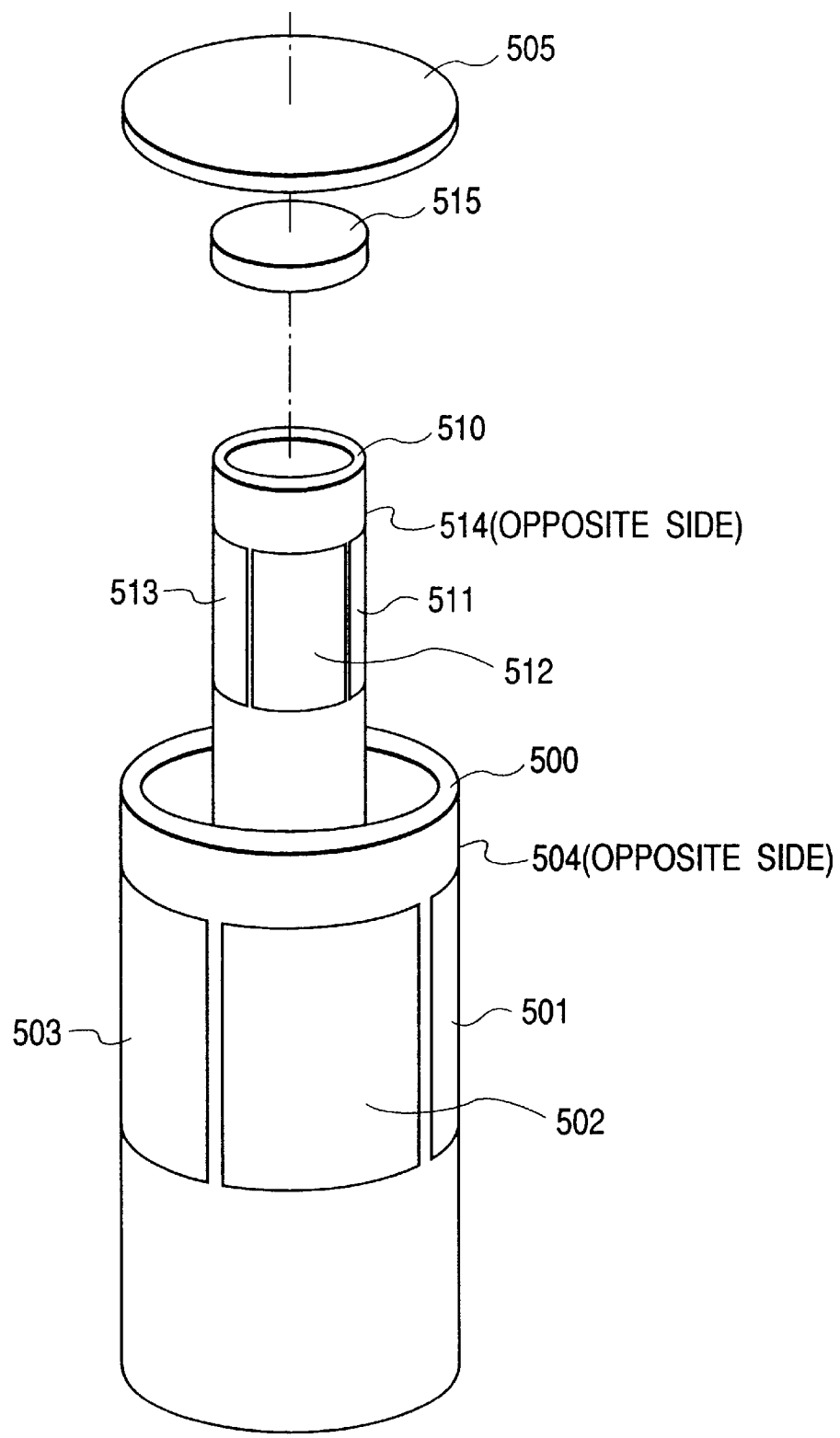
FIG. 11 is an exploded schematic perspective view of a fourth embodiment of drive stage according to the invention.

FIG. 11 is a schematic perspective view of a fourth embodiment of drive stage according to the invention. As seen from FIG. 11, the embodiment comprises a pair of drive stages of cylindrical piezoelectric elements arranged coaxially.

More specifically, a second cylindrical piezoelectric element 510 is coaxially arranged inside a first cylindrical piezoelectric element 500 (although they are exploded in FIG. 11). The outer periphery of the first cylindrical piezoelectric element 500 is divided into four equal sectors and four identical electrodes 501 through 504 are arranged on the respective sectors (although the electrode 504 is not visible in FIG. 11 because it is located on the opposite side). A mechanical stage 505 is bonded to the top of the first cylindrical piezoelectric element 500 (although it is separated from the element 500 in FIG. 11). Similarly, the outer periphery of the second cylindrical piezoelectric element 510 is divided into four equal sectors and four identical electrodes 511 through 514 are arranged on the respective sectors (although the electrode 514 is not visible in FIG. 11 because it is located on the opposite side). A counterweight 515 is bonded to the top of the second cylindrical piezoelectric element 510 (although it is separated from the element 510 in FIG. 11).

The first and second cylindrical piezoelectric elements 500, 510 can be made to bend by controlling the voltages applied to the oppositely disposed pairs of electrodes (501 and 503, 502 and 504, 511 and 513, and 512 and 514) in such a way that the cylindrical piezoelectric elements expand at a side and contract at the opposite side. Additionally, they can be made to expand or contract by applying an identical voltage to all the four electrodes of each of them. Thus, the piezoelectric elements 500, 510 can be controlled for expansion and contraction by means of the voltages applied thereto. Then, the mechanical stage 505 and the counterweight 515 on top of the respective piezoelectric elements can be driven to move three-dimensionally.

Figure 12:
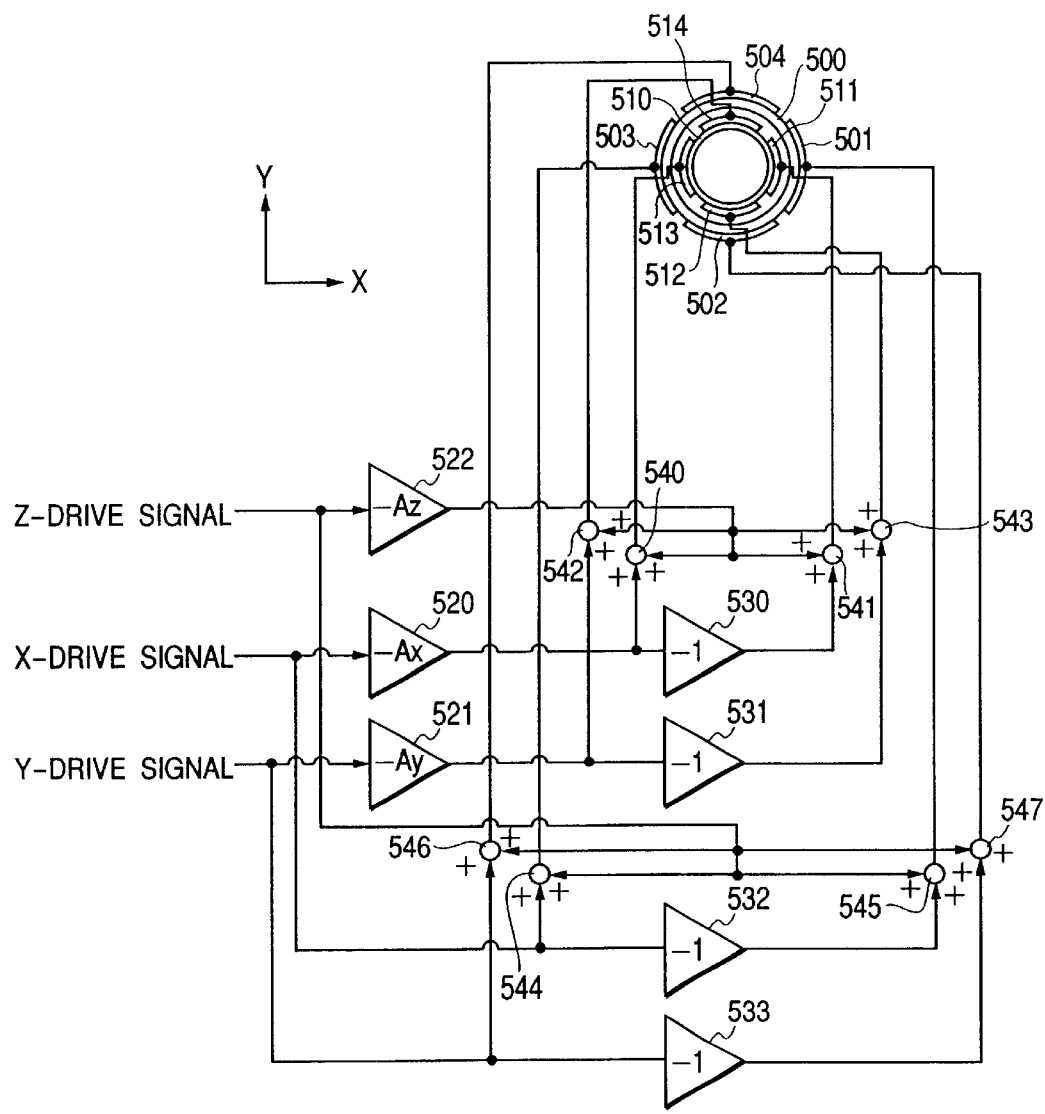
FIG. 12 is a wiring diagram of the drive stage of FIG. 11.

FIG. 12 is a wiring diagram of the fourth embodiment of drive stage according to the invention. With the wiring arrangement as shown in FIG. 12, the outer cylindrical piezoelectric element 500 and the inner cylindrical piezoelectric element 510 are always driven to move in opposite directions.

Figure 13:
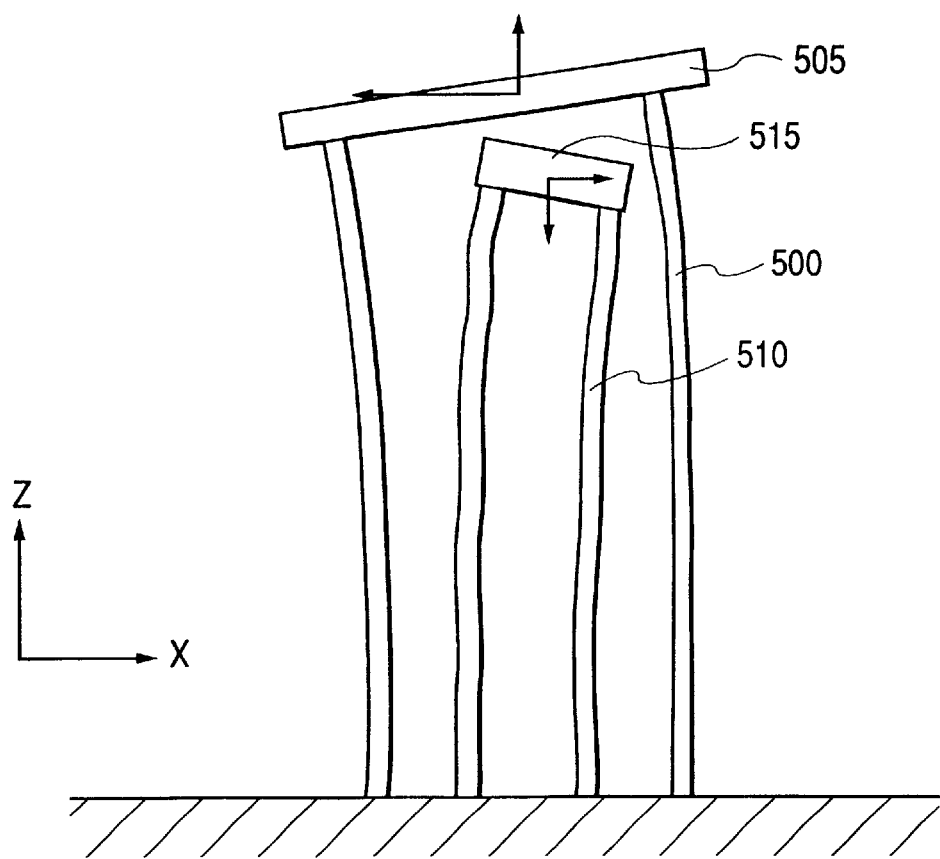
FIG. 13 is a schematic illustration of the motion of the drive stage of FIG. 11.

FIG. 13 is a schematic cross sectional view of the two cylindrical piezoelectric elements when they are driven to deform. In FIG. 13, the outer cylindrical piezoelectric element 500 is bent leftwardly and extended upwardly whereas the inner cylindrical piezoelectric element 510 is bent rightwardly and contracted downwardly. The amplification factors -Ax, -Ay, -Az of the amplifiers 520 through 522 are so selected that the inertial forces of the cylindrical piezoelectric elements 500, 510 are perfectly cancelled.

Preferably, the amplification factors are regulated to show optimal values when the mass of the specimen placed on the mechanical stage is changed.

The embodiment of drive stage according to the invention and having a configuration as described above can provide a stage that is practically free from vibrations when the apparatus is driven at high speed because the outer first cylindrical piezoelectric element 500 and the inner second cylindrical piezoelectric element 510 are always driven so as to cancel the inertial forces respectively generated in them.

[Embodiment 5]

Figure 14:
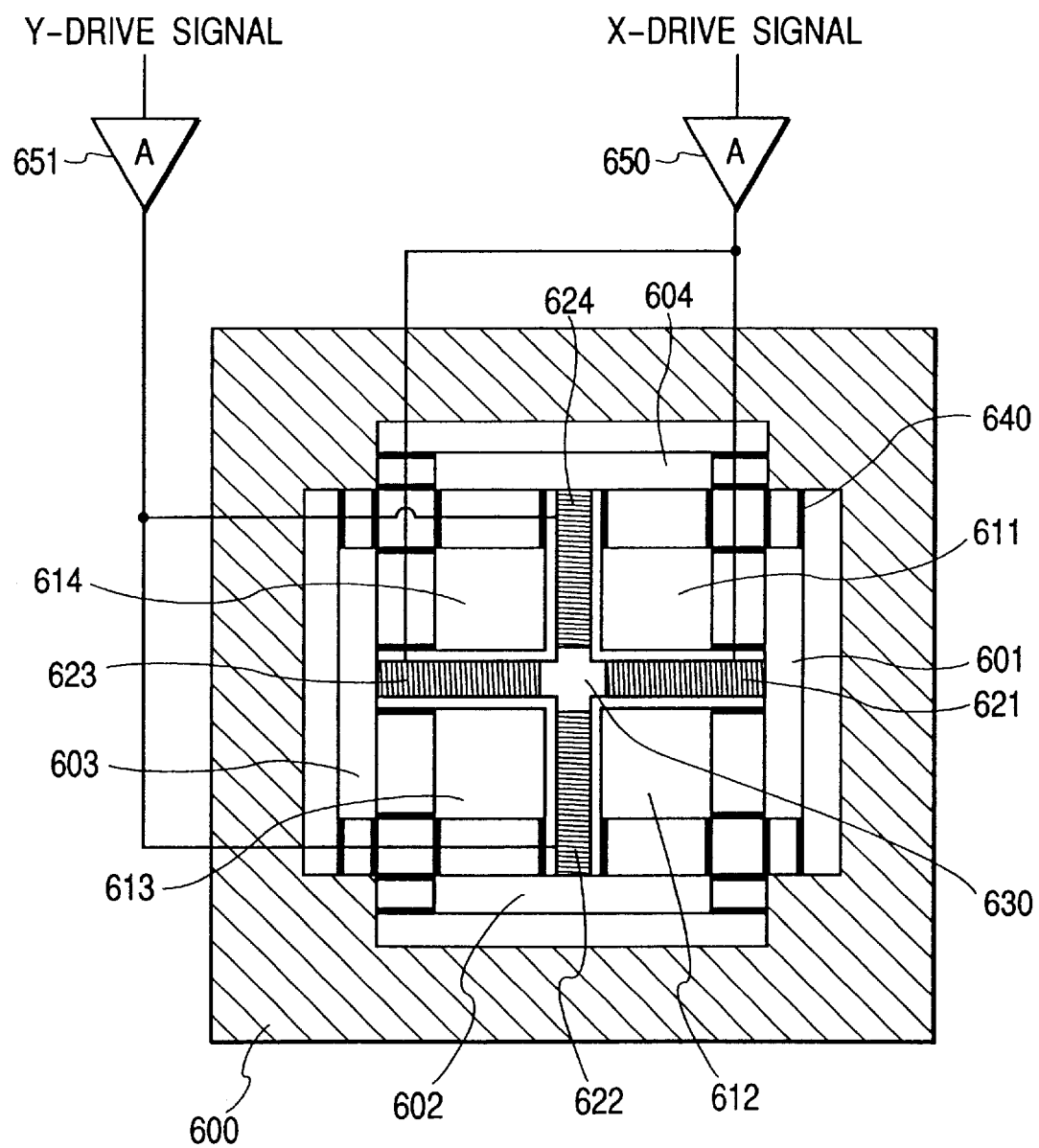
FIG. 14 is a schematic plan view of a fifth embodiment of drive stage according to the invention.

FIG. 14 is a schematic plan view of a fifth embodiment of drive stage according to the invention. As seen from FIG. 14, this embodiment is realized by combining a total of four drive stages.

Mechanical stages 611 through 614 are connected to four auxiliary support bodies 601 through 604 by way of parallel hinge springs 640 and any of the ends of the parallel hinge springs 640 not connected to any of the mechanical stages nor any of the auxiliary support bodies is connected to the support body 600 of the embodiment.

Each of the actuators 621 through 624 has its one end connected to a corresponding one of the auxiliary support bodies 601 through 604 and its other end connected to a support post 630. The support post 630 is integral with the support body 600 (in a manner not shown in FIG. 14). The embodiment is symmetric in terms of left and right and top and bottom in FIG. 14. An X drive signal is supplied to the actuators 621, 623 by way of amplifier 650. A Y drive signal is supplied to the actuators 622, 624 by way of amplifier 651. Thus, the oppositely disposed actuators 621, 623 and 622, 624 respectively expand or contract at the same time. With such a mode of operation, the inertial forces generated in this embodiment of drive stage will be offset as a whole.

Figure 15A:
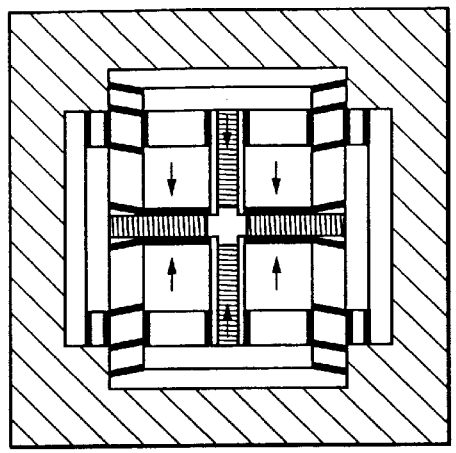
FIGS. 15A, 15B and 15C illustrate so many different motions of the drive stage of FIG. 11.
Figure 15B:
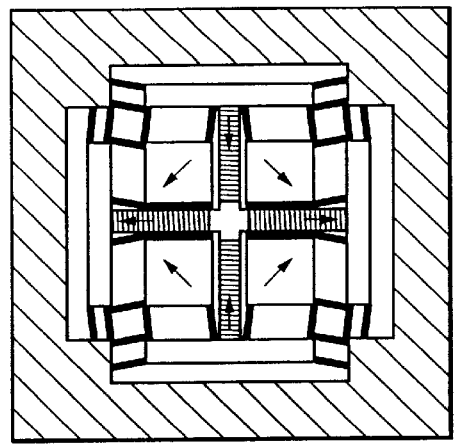
Figure 15C:
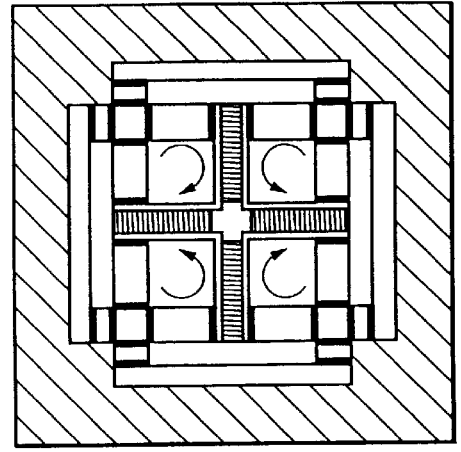

FIGS. 15A through 15C illustrate so many different motions of the fifth embodiment of drive stage according to the invention.

FIG. 15A shows the embodiment where the actuators 622 and 624 are contracted. As the actuators 622 and 624 are contracted, the auxiliary support body 602 is driven to move upwardly while the auxiliary support body 604 is drive to move downwardly in FIG. 15A. Then, the mechanical stages 612 and 613 are driven to move upwardly, while the mechanical stages 611 and 614 are driven to move downwardly in FIG. 15A in an interlocked fashion. Then, all the inertial forces generated in the embodiment will be completely offset as the support bodies and the mechanical stages move symmetrically in terms of upward and downward.

In FIG. 15B, the actuators 622 and 624 are contracted while the actuators 621 and 623 are expanded. As a result, the auxiliary support body 601 is driven to move rightwardly and the auxiliary support body 602 is driven to move upwardly in FIG. 15B, while the auxiliary support body 603 is driven to move leftwardly and the auxiliary support body 604 is driven to move downwardly in FIG. 15B. At the same time, the mechanical stage 611 is driven to move toward the lower right corner and the mechanical stage 612 is driven to move toward the upper right corner, while the mechanical stage 613 is driven to move toward the upper left corner and the mechanical stage 614 is driven to move toward the lower left corner in FIG. 15B. As the support bodies and the mechanical stages are driven to move symmetrically as a whole in terms of upward and downward and left and right, all the inertial forces generated in the embodiment by the motions will be offset.

FIG. 15C illustrates how the components of the embodiment move when cos ω)t is used for X drive signal and sin ωt is used for Y drive signal. The auxiliary support bodies 601 through 604 are driven in a sine wave mode, while the mechanical stages 611 through 614 are driven to draw a circle.

As in the case of FIGS. 15A and 15B, all the inertial forces generated in the embodiment by the motions will be offset as the support bodies and the mechanical stages are driven to move symmetrically as a whole.

While a total of four mechanical stages are provided in this embodiment of drive stage according to the invention, it is a matter of choice if all of them are used or any of them are selectively used.

As described above in detail, since all the inertial forces generated in a drive stage according to the invention are totally offset by each other, it is practically free from vibrations when it is driven two dimensionally at high speed.

What is claimed is:

1. A drive stage comprising:
   a support body;
   a plurality of movable parts movably supported relative to said support body; and
   an actuator for driving said plurality of movable parts to move, wherein said plurality of movable parts are driven by said actuator such that, when one of said movable parts scans a substance arranged relative to the drive stage, the remaining movable parts move in directions selected to mutually offset inertial forces generated by the respective movable parts, thereby reducing vibration of said support body relative to the substance.

2. A drive stage according to claim 1, wherein said actuator comprises a plurality of actuators and each of said plurality of actuators links one of the plurality of movable parts to said support body and moves the linked movable part relative to said support body.

3. A drive stage according to claim 2, wherein said plurality of actuators have respective amplifiers for amplifying a drive signal before it is applied to said actuator.

4. A drive stage according to claim 3, wherein
each of said plurality of movable parts is supported by an elastic member relative to the support body and shows a frequency the same as those of the remaining movable parts for free vibration.

5. A drive stage according to claim 2, wherein said plurality of actuators are two cylindrical piezoelectric elements arranged coaxially.

6. A drive stage according to claim 1, wherein
said actuator comprises a plurality of actuators for driving the plurality of movable parts respectively, said plurality of actuators have respective amplifiers for amplifying a respective drive signal, and an amplification factor of each of the amplifiers is so selected as to cause the inertial forces generated by the movement of said respective movable parts to be offset by each other.

7. A drive stage according to claim 6, wherein
each of said amplifiers is controllable as a function of a load of the respective movable parts.

8. A drive stage according to claim 6, wherein
said amplifiers are adapted to select a frequency characteristic of a drive signal as a function of drive characteristics of the respective movable parts.

9. A scanning probe microscope comprising a stage and a probe arranged vis-a-vis the stage, either the stage or the probe being arranged on the movable parts of a drive stage according to claim 1, said scanning probe microscope being adapted to observe a surface of a specimen by detecting the physical interaction of the specimen and the probe, while driving the specimen on the stage and the probe to move relative to each other by means of said drive stage.

10. An information recording/reproducing apparatus comprising a recording medium and a probe arranged vis-a-vis the recording medium, either the recording medium or the probe being arranged on the movable parts of a drive stage according to claim 1, said information recording/reproducing apparatus being adapted to at least either record or reproduce information by applying a voltage between the recording medium and the probe, while driving the recording medium and the probe to move relative to each other by means of said drive stage.

11. A drive stage according to claim 1, wherein said actuator links two movable parts and moves one of the two movable parts relative to the other.

12. A method for controlling a drive stage comprising a support body, a plurality of movable parts movably supported relative to said support body and a plurality of actuators, each of said actuators having an amplifier for amplifying a drive signal for driving said movable parts to move, said method comprising the step of applying a drive signal to the respective actuators by way of the amplifiers to drive the movable parts to move such that one of the movable parts scans a substance arranged relative to the drive stage, while amplification factors of the amplifiers are so selected as to meet the requirement expressed by the formula:

$$M_1 a_1 + M_2 a_2 + \ldots + M_n a_n = O$$

where $M_1, M_2, \ldots$ and $M_n$ respectively represent masses of the plurality of movable parts (n being an integer not smaller than 2) and $a_1, a_2, \ldots$ and $a_n$ respectively represent acceleration vectors of the movable parts as observed when they are moving, thereby reducing vibration of the support body relative to the substance.

* * * * *

UNITED STATES PATENT AND TRADEMARK OFFICE
CERTIFICATE OF CORRECTION

PATENT NO. : 6,459,088 B1
DATED : October 1, 2002
INVENTOR(S) : Susumu Yasuda et al.

It is certified that error appears in the above-identified patent and that said Letters Patent is hereby corrected as shown below:

Title page,
Item [30], Foreign Application Priority Data,
      "Jan. 16, 1998 (JP) ….. 10-218600" should read
      -- July 16, 1998 (JP) ….. 10-218600 --.
Item [56], FOREIGN PATENT DOCUMENTS,
      "10271856 A" should read -- 10-271856 A --.

Column 1,
Line 10, "an" should read -- a --.
Line 14, "electroco-" should read -- electrocon- --.
Line 64, "above described" should read -- above-described --.

Column 2,
Line 59, "above described" should read -- above-described --.

Column 3,
Line 30, "above identified" should read -- above-identified --.

Column 5,
Line 21, "invention" should read -- invention are cancelled --.
Line 23, "analyse" should read -- analyze --.

Column 7,
Line 7, "oppositely" should read -- are oppositely --.
Line 20, "to" (second occurrence) should be deleted.
Line 25, "move" should read -- move in --.

Column 8,
Lines 20, 22 and 44, "electrocoductive" should read -- electroconductive --.

Column 9,
Line 6, "electrocoductivity" should read -- electroconductivity --.
Line 21, "above described" should read -- above-described --
Line 44, "above" should read -- above- --.
Line 56, "tot he" should read -- to the --.
Line 57, "in" should read -- on --.

UNITED STATES PATENT AND TRADEMARK OFFICE
CERTIFICATE OF CORRECTION

PATENT NO. : 6,459,088 B1
DATED : October 1, 2002
INVENTOR(S) : Susumu Yasuda et al.

It is certified that error appears in the above-identified patent and that said Letters Patent is hereby corrected as shown below:

Column 10,
Line 25, "electrocoductive" should read -- electroconductive --.
Lines 40 and 42, "above described" should read -- above-described --.

Column 11,
Line 36, "cross sectional" should read -- cross-sectional --.

Column 12,
Line 17, "drive" should read -- driven --.
Line 24, "ward" should read -- ward directions --.
Line 39, "right" should read -- right directions --.
Line 43, "o)t" should read -- ωt --.

Signed and Sealed this

Twenty-fifth Day of November, 2003

JAMES E. ROGAN
*Director of the United States Patent and Trademark Office*